United States Patent [19]

Audeh et al.

[11] Patent Number: 5,482,692
[45] Date of Patent: Jan. 9, 1996

[54] SELECTIVE CATALYTIC REDUCTION OF NITROGEN OXIDES USING A FERROCENE IMPREGNATED ZEOLITE CATALYST

[75] Inventors: Costandi A. Audeh, Princeton, N.J.; Sanjay B. Sharma, Langhorne, Pa.; David S. Shihabi, Pennington, N.J.

[73] Assignee: Mobil Oil Corporation, Fairfax, Va.

[21] Appl. No.: 271,694

[22] Filed: Jul. 7, 1994

[51] Int. Cl.$^6$ .................................................. C01B 21/04
[52] U.S. Cl. ................................................... 423/239.2
[58] Field of Search ...................... 423/239.2; 502/66, 502/68, 71, 85

[56] References Cited

U.S. PATENT DOCUMENTS

| | | | |
|---|---|---|---|
| 4,431,746 | 2/1984 | Rollman | 502/73 |
| 4,444,914 | 4/1984 | Smith et al. | 521/130 |
| 4,778,665 | 10/1988 | Krishnamurthy et al. | 423/239 |
| 4,867,954 | 9/1989 | Staniulis et al. | 423/239 |
| 4,961,917 | 10/1990 | Byrne | 423/239 |
| 4,979,447 | 12/1990 | Farrar | 110/345 |
| 4,998,876 | 3/1991 | Farrar | 431/3 |
| 5,024,981 | 6/1991 | Speronello et al. | 502/67 |
| 5,173,278 | 12/1992 | Marler et al. | 423/239 |
| 5,254,322 | 10/1993 | Bhore et al. | 423/239.2 |
| 5,271,913 | 12/1993 | Iida et al. | 423/213.2 |
| 5,310,714 | 5/1994 | Grasselli et al. | 502/64 |

*Primary Examiner*—Michael Lewis
*Assistant Examiner*—Thomas G. Dunn, Jr.
*Attorney, Agent, or Firm*—A. J. McKillop; D. P. Santini; G. L. Harris

[57] ABSTRACT

An exhaust gas treatment process useful for the removal of nitrogen oxides using an iron impregnated zeolite as the catalyst and ammonia as a reducing agent. It is desired to extend the effective temperature range for the selective catalytic reduction (SCR) of nitrogen oxides below about 400° C. This is accomplished in the instant invention through the use of an intermediate pore size zeolite, such as ZSM-5, based catalyst which has been ferrocene treated to substantially incorporate iron into its pores. The catalyst may also be hydrothermally treated at least once, if desired.

18 Claims, No Drawings

SELECTIVE CATALYTIC REDUCTION OF NITROGEN OXIDES USING A FERROCENE IMPREGNATED ZEOLITE CATALYST

CROSS-REFERENCE TO RELATED APPLICATIONS

This application is related by disclosure of similar subject matter to U.S. application Ser. No. 07/910,861, filed Jul. 8, 1992 now U.S. Pat. No. 5,310,714 and to U.S. application Ser. No. 08/148,943, filed Nov. 8, 1993 now U.S. Pat. No. 5,374,410.

1. Field of the Invention

This invention is concerned with the abatement of nitrogen oxides in industrial exhaust gases. In particular, it is concerned with a catalytic method for efficiently reacting the nitrogen oxides with ammonia before discharge to the atmosphere. It is more particularly concerned with the use of a specially prepared ferrocene impregnated zeolite as the catalyst in the above method.

2. Background of the Invention

Although several nitrogen oxides are known which are relatively stable at ambient conditions, it is generally recognized that two of these, viz. nitric oxide (NO) and nitrogen dioxide ($NO_2$), are the principal contributors to smog and other undesirable environmental effects when they are discharged into the atmosphere. These effects will not be discussed further here since they are well recognized and have led various government authorities to restrict industrial emissions in an attempt to limit the level of the oxides in the atmosphere. Nitric oxide and nitrogen dioxide, under appropriate conditions, are interconvertible according to the equation.

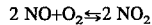

$$2\ NO + O_2 \rightleftharpoons 2\ NO_2$$

For purposes of the present invention, $NO_x$ will be used herein to represent nitric oxide, nitrogen dioxide, and mixtures thereof.

Formation of man-made nitrogen oxides from the elements occurs in the high temperature zones of combustion processes. The internal combustion engine, and coal or gas-fired or oil-fired furnaces, boilers and incinerators, all contribute to $NO_x$ emissions. In general, fuel-rich combustion mixtures produce exhaust gases with lower contents of $NO_x$ than do lean mixtures. Although the concentrations of $NO_x$ in the exhaust gases produced by combustion usually are low, the aggregate amount discharged in industrial and/or highly populated areas may tend to cause problems. Other industrial sources of pollution also exist. These are associated with the manufacture of nitric acid, with nitration of organic chemicals, and with other chemical operations such as the reprocessing of spent nuclear fuel rods by dissolution in nitric acid to recover uranyl nitrate followed by calcination to convert the nitrate to uranium oxide. In these instances the waste gases may contain relatively high levels of $NO_x$, approaching 3 %.

The so-called "stable" nitrogen oxides have in common the somewhat peculiar property that although they are thermodynamically unstable with respect to decomposition into elemental oxygen and nitrogen, no simple, economical method has been described for inducing this decomposition. It has been discovered, however, that the addition of a reductant such as ammonia to the exhaust gas, under appropriate reaction conditions, converts $NO_x$ to elemental nitrogen and steam and denitrifies the exhaust gas.

The process of adding ammonia to industrial flue gas followed by contact with a catalyst at a temperature in the range of about 200°–600° C. to denitrify the flue gas has come to be known as the process for Selective Catalytic Reduction (SCR) of $NO_x$. In order to avoid confusion, any reference made herein to "Selective Catalytic Reduction," or to "SCR," is intended to refer to only the process in which a mixture of $NO_x$ and $NH_3$ are induced to react catalytically at elevated temperatures, and to exclude processes in which other reductants such as CO or hydrogen gas are substituted for $NH_3$.

The term "denitrify" as used herein, means to reduce the amount of one or more noxious nitrogen compounds (such as NO, $NO_x$ and HCN) contained in a waste gas, preferably by conversion to nitrogen gas.

The use of zeolite-based catalysts for the SCR of nitrogen oxides with ammonia is well established. For example, U.S. Pat. No. 4,220,632 to Pence et al. discloses a process for reducing noxious nitrogen oxides from a fossil-fuel-fired power generation plant, or from other industrial plant off-gas streams, to elemental nitrogen and/or innocuous nitrogen oxides employing ammonia as the reductant and, as the catalyst, the hydrogen or sodium form of a zeolite having pore openings of about 3 to 10 Angstroms.

U.S. Pat. No. 5 173 278 to Marler et al discloses an SCR process where the ammonia needed for the reduction of $NO_x$ is generated, at least in part, by hydrolysis of HCN over a supported transition metal and/or a crystalline zeolite catalyst. The process described in this patent appears to require that HCN be present.

In particular, it is known that the hydrogen form of ZSM-5 (HZSM-5) is well suited for this reaction at temperatures between about 400°–500° C. U.S. Pat. No. 4,778,665 to Krishnamurthy et al. describes an SCR process for pretreating industrial exhaust gases contaminated with $NO_x$ in which the catalyst has a silica to alumina ratio of at least about 20 and a Constraint Index of 1 to 12. The entire contents of this patent are incorporated herein by reference as if fully set forth.

At temperatures below about 400° C., HZSM-5 is significantly less efficient at removing nitrogen oxides from the gas stream. It is desired to develop a process that allows use of a temperature range for the selective catalytic reduction of nitrogen oxides of from about 200° C. to about 600° C. or more.

Ferrocene (dicyclopentadienyliron) is a known $NO_x$ and smoke inhibiting material. Specifically, ferrocene has been disclosed as being useful to enhance selective noncatalytic $NO_x$ reduction when it is combusted in the firebox of a heater or boiler along with the normal combustion fuel. See U.S. Pat. No. 5,118,282. Ferrocene was also identified in U.S. Pat. Nos. 4,998,876 and 4,979,447 as a combustion promoter that was effective to allow the reduction of excess combustion air requirements, thus reducing $NO_x$ production. U.S. Pat. No. 4,955,331 discloses the use of a liquid nonleaded fuel containing ferrocene in an Otto engine to reduce the $NO_x$ emissions from the engine. These applications require the continuous combustion of ferrocene to achieve the desired $NO_x$ reduction. It is desired to find a process that achieves $NO_x$ reduction without the need for the continuous combustion of ferrocene.

BRIEF SUMMARY OF THE INVENTION

It has now been found that introducing iron into the pores of an intermediate pore size zeolite, e.g., ZSM-5, using ferrocene significantly improves the SCR activity of the catalyst at temperatures below about 400° C., without adversely affecting the $NO_x$ (NO and $NO_2$) reduction capacity of the catalyst above about 400° C. For example, the introduction of iron into ZSM-5 according to the method of this invention significantly increases the operational temperature range of the catalyst to generally about 200° C. to about 600° C. or higher, specifically about 200° C. to about 550° C., more specifically about 200° C. to about 400° C. The ferrocene treatment of intermediate pore zeolites is also effective to increase the hydrothermal stability of the catalysts in SCR applications. Also, the $NO_x$ reduction is achieved without using continuous ferrocene addition into a combustion process.

In this invention, iron is substantially incorporated into the pores of the zeolite. This is done by impregnating the zeolite with ferrocene dissolved in a solvent, wherein the effective atomic size of the ferrocene is smaller than the smallest dimension of the entrance to the zeolite cavities or pores. The impregnated zeolite is then recovered and calcined. Then a mixture of a $NO_x$ containing exhaust gas and ammonia is contacted with the calcined zeolite under conditions sufficient to convert a substantial portion of the $NO_x$ in the exhaust gas to $N_2$. This invention does not require that HCN be present in the gas mixture to be effective.

DETAILED DESCRIPTION

The term "exhaust gas" as used herein means any waste gas which is formed in an industrial process or operation and which is normally disposed of by discharge to the atmosphere, with or without additional treatment. "Exhaust gas" also includes the gas produced by internal combustion engines. The composition of such a gas varies and depends on the particular process or operation which leads to its formation. When formed in the combustion of fossil fuels, it will generally comprise nitrogen, steam and carbon dioxide in addition to low levels, such as up to about 1000 ppm, of nitric oxide plus nitrogen dioxide. Sulfur-containing fuels will typically produce an exhaust gas that contains one or more sulfur oxides, such as $SO_2$. Rich fuel-air mixtures will generally produce an exhaust gas that contains little if any free oxygen along with some carbon monoxide. Lean fuel-air mixtures, i.e., mixtures in which more air is provided than is stoichiometrically required to completely burn the fuel, will form an exhaust gas that contains gaseous oxygen. The foregoing is a general description given to illustrate the variability in the composition of the exhaust gases from fossil fuel combustion. Other industrial processes such as nitration, uranium recovery, and calcining nitrate salt containing solids produce exhaust gases which can have compositions different from those noted above. They may be substantially devoid of steam, for example, and may contain very high concentrations of nitrogen or other inert gases.

It has been found that a specially prepared iron containing zeolite, as more fully described below, provides a very efficient catalyst for the selective conversion of $NO_x$ in industrial exhaust gases. In this invention, the iron is substantially incorporated into the pores of the zeolite by impregnating the zeolite with ferrocene which has been dissolved in a suitable solvent. The solvent is then removed from the impregnated zeolite, which is then calcined. Next, a mixture of $NO_x$ containing exhaust gas and ammonia is contacted with the calcined zeolite under conditions effective to convert a substantial portion of the $NO_x$ in the exhaust gas to $N_2$. The gas to be treated may contain ammonia or ammonia may be added to the gas to be treated. This invention does not require that HCN be present in the gas mixture to be effective.

The conversion of $NO_x$ to $N_2$ is believed to proceed generally according to equations (1) and (2).

$$2\ NO_2 + 4\ NH_3 + O_2 \rightarrow 3\ N_2 + 6\ H_2O \qquad (1)$$

$$4\ NO + 4\ NH_3 + O_2 \rightarrow 4\ N_2 + 6\ H_2O \qquad (2)$$

The process of this invention is typically conducted by premixing the exhaust gas with ammonia at a temperature of at least about 200° C. and contacting the mixture with the catalyst at a temperature of about 200° C. to about 600° C. or more at a space velocity effective to induce the desired degree of conversion. In the event that the exhaust gas contains insufficient oxygen to at least satisfy the stoichiometry of equations (1) and (2), it is preferred to also include in the mixture adequate oxygen-containing gas such as air to provide the oxygen.

The method of this invention is advantageous in providing effective conversion at temperatures of 400° C. and lower, particularly 350° C. and lower.

The process of this invention generally provides that the $NO_x$ contaminated exhaust gas be mixed at a temperature of at least about 200° C. with gaseous ammonia. That this mixture be formed at an elevated temperature is important to avoid the formation of solid ammonium nitrite or nitrate, which is potentially hazardous. The amount of ammonia included in the mixture should be approximately the amount required to stoichiometrically react with the $NO_x$ present in the exhaust gases. If the mixture of ammonia and exhaust gas contains oxygen in an amount which at least satisfies the stoichiometry of Equations (1) and (2) shown above, then the stoichiometry is that given by those equations. In the event that the exhaust gas contains less oxygen than required by (1) and (2), it is preferred to add at least the required oxygen, although this invention is operable even with a deficiency of oxygen. With a deficiency, however, the stoichiometry changes, requiring somewhat less ammonia. This is illustrated by equations (3) and (4), which represent the stoichiometry in the total absence of oxygen.

$$6\ NO_2 + 8\ NH_3 \rightarrow 7\ N_2 + 12\ H_2O \qquad (3)$$

$$6\ NO + 4\ NH_3 \rightarrow 5\ N_2 + 6\ H_2O \qquad (4)$$

As used herein, the expression "approximate stoichiometric amount of ammonia" is intended to mean about 0.75 to about 1.25 times the molar amount of ammonia indicated in equations (1) and (2) when excess oxygen is present, these amounts being adjusted to reflect the somewhat lesser demand when operating with a deficiency of oxygen.

The mixture formed as described above is contacted with a crystalline zeolite molecular sieve catalyst having the properties described above. Crystalline zeolites are a known type of porous crystalline siliceous solid, and are described in Breck, "Zeolite Molecular Sieves", John Wiley and Sons, N.Y., N.Y. (1974), the entire content of which is incorporated herein by reference for background purposes.

The most common crystalline zeolites are those having robust 3-dimensional alumina silicate frameworks, and a large number of these are described by Breck (ibid). However, it is known that analogous framework structures may be synthesized where iron, boron, or other elements replace part or almost all of the aluminum as the trivalent heteroatom. Crystalline materials having essentially the same crystal structure as a known zeolite, as evidenced by X-ray diffraction, but consisting essentially of silica, have been described. Some investigators have interpreted the term "zeolite" in a narrow sense, restricting it to framework compositions formed from silica and alumina. In the present application, such restricted definition is believed to be unduly narrow. The term "zeolite" is used herein to describe structures in which silica is the principal framework constituent and in which aluminum is the predominant trivalent heteroatom.

The exhaust gas and zeolite contacting is typically conducted at a temperature of about 200° C. to about 600° C. or more, e.g., up to about 1,000° C., and specifically at about 200° C. to about 550° C., more specifically at about 200° C. to about 400° C., most specifically about 230° C. to about 350° C. and at a gas hourly space velocity, GHSV, (vols. of gas at STP per volume of catalyst per hour) adjusted to provide the desired conversion. The GHSV can be from about 1,000 to about 100,000 $hr^{-1}$, and specifically from about 2,500 to about 50,000 $hr^{-1}$, more specifically from about 5,000 to about 20,000 $hr^{-1}$. The process of this invention is operable at subatmospheric to superatmospheric pressure, e.g. at about 5 to about 500 psia, and specifically at about 10 to about 50 psia, i.e. near atmospheric pressure.

In general, since the reaction is exothermic but low concentrations of $NO_x$ are present, adequate temperature control is readily achieved with a simple stationary fixed-bed of catalyst. However, other contacting means are also contemplated, such as contacting with a fluid bed, a transport bed, and a monolithic catalyst structure such as a honeycomb.

A catalyst useful in this invention will now be described in detail. It comprises an intermediate pore size zeolite (e.g., less than about 7 Angstroms pore size, such as from about 5 to less than about 7 Angstroms) having a silica to alumina ratio of at least about 5, specifically at least about 20, and a Constraint Index of about 1 to about 12, said zeolite having been contacted in a suitable manner to incorporate iron into the pores of the crystal. The Constraint Index qualifies it as having an intermediate pore size, as will be more fully described below. Examples of such zeolites include ZSM-5 (U.S. Pat. No. 3,702,886 and U.S. Pat. No. Re. 29,948); ZSM-11 (U.S. Pat. No. 3,709,979); ZSM-12 (U.S. Pat. No. 3,832,449); ZSM-21 (U.S. Pat. No. 4,046,859); ZSM-22 (U.S. Pat. No. 4,556,477); ZSM-23 (U.S. Pat. No. 4,076,842); ZSM-35 (U.S. Pat. No. 4,016,245); ZSM-38 (U.S. Pat. No. 4,406,859); ZSM-48 (U.S. Pat. No. 4,397,827); ZSM-57 (U.S. Pat. No. 4,046,685); and ZSM-58 (U.S. Pat. No. 4,417,780). The entire contents of the above references are incorporated by reference herein. Such zeolites are sometimes referred to as being of the ZSM-5 type, and this term may sometimes be used herein to designate zeolites useful in this invention.

The ZSM-5 type zeolites are members of a novel class of zeolites that exhibit unusual properties. Although these zeolites have unusually low alumina contents, i.e. high silica to alumina ratios, they are active for converting organic compounds. The activity is surprising since catalytic activity is generally attributed to framework aluminum atoms and/or cations associated with these aluminum atoms. These zeolites have an intracrystalline sorption capacity for normal hexane which is greater than that for water, i.e. they exhibit "hydrophobic" properties.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels.

An important characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure typically have a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. In W. M. Meier and D. H. Olson, "Atlas of Zeolite Structure Types," 138–139, Butterworth-Heineman, Boston, Mass., (3rd ed. 1992), and in Roland von Ballmoos and John B. Higgins, "Collection of Simulated XRD Powder Patterns for Zeolites," 10 Zeolites, 313S, at 442S–445S, and at 504S, Butterworth-Heineman, Boston, Mass. (2d ed. 1990), incorporated by reference herein, ZSM-5 and similar zeolites have been identified as having a framework topology that is identified as MFI. Also included in the second of the above references is the X-ray diffraction pattern for ZSM-5.

The ZSM-5 type zeolites referred to herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section than normal hexane is excluded and the zeolite is not of the ZSM-5 type. Windows of 10-membered rings are preferred, although in some instances excessive puckering of the rings or pore blockage may render these zeolites ineffective.

Rather than attempt to judge from crystal structure whether or not a zeolite possesses the necessary constrained access to molecules larger than normal paraffins, a simple determination of the Constraint Index may be made. The method by which Constraint Index is determined is described fully in U.S. Pat. No. 4,016,218, incorporated herein by reference for details of the method. Constraint Index (CI) values for some typical zeolites including some which are suitable as catalysts in the process of this invention are as follows:

|  | CI | (at test temperature) |
|---|---|---|
| ZSM-4 | 0.5 | (316° C.) |
| ZSM-5 | 6–8.3 | (371° C.–316° C.) |
| ZSM-11 | 5–8.7 | (371° C.–316° C.) |
| ZSM-12 | 2.3 | (316° C.) |
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-48 | 3.5 | (538° C.) |
| ZSM-50 | 2.1 | (427° C.) |
| MCM-22 | 0.6–1.5 | (399° C.–454° C.) |
| TMA Offretite | 3.7 | (316° C.) |
| TEA Mordenite | 0.4 | (316° C.) |
| Clinoptilolite | 3.4 | (510° C.) |
| Mordenite | 0.5 | (316° C.) |
| REY | 0.4 | (316° C.) |
| Amorphous Silica-alumina | 0.6 | (538° C.) |
| Dealuminized Y | 0.5 | (510° C.) |
| Erionite | 38 | (316° C.) |
| Zeolite Beta | 0.6–2.0 | (316° C.–399° C.) |

The above-described Constraint Index is an important and even critical definition of those zeolites which are useful in the process of the present invention. The very nature of this parameter and the above-referenced procedure by which it is determined, however, admits of the possibility that a given zeolite can be tested under somewhat different conditions and thereby exhibit different Constraint Indices. Constraint Index appears to vary somewhat with the severity of the conversion operation and the presence or absence of binder material. Similarly, other variables such as crystal size of the zeolite, the presence of occluded contaminants, etc., may affect the observed Constraint Index value. It will therefore be appreciated that it may be possible to select test conditions, e.g., temperature, as to establish more than one value for the Constraint Index of a particular zeolite. This explains the range of Constraint Indices for some zeolites, such as ZSM-5, ZSM-11, MCM-22, and Beta.

Zeolites useful in this invention may be incorporated in or composited with another material usually referred to as a matrix or binder. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-berylia, silica-titania, as well as ternary compounds such as silica-alumina-thoria, silica-alumina-zirconia, silica-alumina-magnesia, and silica-magnesia-zirconia. A mixture of these components could also be used. The matrix may be in the form of a cogel. The relative proportions of zeolite component and inorganic oxide gel matrix on an anhydrous basis may vary widely with the zeolite content ranging from between about 5 to about 99 percent by weight and more usually in the range of about 10 to about 80 percent by weight of the dry composite.

Original ions, e.g., alkali or alkaline earth metal, of the as-synthesized ZSM-5 type material and any found in the ZSM-5/matrix material can be replaced in accordance with techniques well known in the art, at least in part, by ion exchange with other ions. For the present catalyst composition, preferred replacing ions include hydrogen ions and hydrogen precursor, e.g., ammonium ions. ZSM-5 in the hydrogen exchanged form is referred to herein as HZSM-5. Typical ion exchange techniques would be to contact the synthetic ZSM-5 type material or ZSM-5/matrix material with a solution containing a salt of the desired replacing ion or ions. Examples of such salts include the halides, e.g., chlorides, nitrates and sulfates. Representative ion exchange techniques are disclosed in a wide variety of patents including U.S. Pat. Nos. 3,140,249; 3,140,251; and 3,140,253, incorporated by reference herein.

In one aspect of the present invention, ZSM-5 partially in the hydrogen form which has previously been used in an acid-catalyzed organic conversion reaction until it has become spent, i.e. not regenerable to an economically useful level, is useful in this invention. Carbon deposits that are on the spent catalyst should be removed by calcination prior to catalytic use herein The term "spent", as used herein, does not necessarily mean that the catalyst has no activity, but rather that its activity is reduced and/or its cycle life is reduced, and/or its selectivity is reduced, to the point where it should be discharged. Typically, a spent dewaxing catalyst, for example, has an alpha value of about 40 (65 wt. % zeolite content) while the (steamed) fresh catalyst had an alpha value of about 65 (65 wt. % zeolite content), and the spent catalyst has a reduced cycle time between regenerations.

As mentioned above, catalysts useful in this invention comprise intermediate pore size or ZSM-5 type zeolites that substantially include iron in the pores of the zeolite. Catalysts useful in this invention are typically prepared by impregnating the zeolite with ferrocene which has been dissolved in a suitable solvent. Suitable solvents are those which dissolve the ferrocene and may then be removed from the impregnated zeolite under conditions sufficiently mild as to avoid causing the ferrocene to sublimate off the zeolite. Examples of suitable organic solvents include benzene, toluene, xylenes, and hexane among others. The impregnation is typically conducted for more than about 4 hours, specifically from about 4 hours to several days, more specifically from about 6 hours to about 100 hours. The impregnation is generally conducted at conditions effective to put about 0.01 to about 5 wt. %, typically at least about 0.4 wt. % specifically at least about 0.6 wt. % , more specifically at least about 1 wt. %, most specifically at least about 15 wt. % preferably about 2 wt. % iron into the zeolite.

It has unexpectedly been found that catalysts treated to contain the iron concentrations described above, prepared according to the method of this invention, are more active for SCR at temperatures between about 200° C. and about 600° C. and are more hydrothermally stable in SCR applications than catalysts that have not been so treated. It has also been unexpectedly found that catalysts prepared and hydrothermally treated according to this invention have a further enhanced hydrothermal stability.

Catalysts prepared according to this invention substantially include iron in the pores of the zeolite. Without intending to be bound thereby, by this is meant that the catalysts of this invention are believed to have some or all of the iron in the pores of the zeolite rather than on the surface of the zeolite or on the matrix material.

The impregnation may occur either before or after the zeolite is combined with the matrix. For example, if the zeolite is first combined with the matrix and then impregnated, ferrocene that is deposited on the surface of the zeolite and on the matrix may be washed off using a solvent having an effective atomic diameter that is larger than the zeolite pore size, e.g., an organic solvent such as Tetraline®.

The impregnation may be conducted after first drying or dehydrating the zeolite. Also, the ferrocene solution may be prepared using a water-free or dry solvent.

The impregnated zeolite is recovered by removing the solvent from the zeolite. It is desired to remove the solvent without causing the ferrocene to sublimate off the zeolite. One possible way is to evaporate the solvent at a temperature less than the ferrocene sublimation temperature, 100° C. This solvent removal may be done at superatmospheric pressure, if desired, or pressures ranging from subatmospheric to atmospheric. The recovered ferrocene impregnated zeolite is then typically calcined at about 450° C. to about 550° C. to oxidize the ferrocene and to convert the iron to its oxide.

The calcination or oxidation step can be performed at a temperature up to a limit imposed by the irreversible thermal degradation of the crystalline structure of the zeolite, typically up to about 925° C. If desired, the thermal treatment conditions may be adjusted to leave a small amount of carbon on the catalyst.

The catalyst may also be hydrothermally treated at least once before use, specifically two or more hydrothermal treatments at different temperatures, e.g., increasing temperatures, may be used. This hydrothermal treatment may include contact of the catalyst or the catalyst and the binder with water vapor in air or another suitable gas stream, e.g., about 5 to about 100% steam, at a temperature of greater than about 400° C., specifically greater than about 700° C., for a period of from a few minutes to about 100 hours or more. Typical steaming conditions are described in U.S. Pat. Nos. 4,429,176; 4,522,929; 4,594,146; and 4,663,492; each incorporated by reference herein.

The form and the particle size of the catalyst are not critical to the present invention and may vary depending, for example, on the type of reaction system employed. Non-limiting examples of the shapes of the catalyst for use in the present invention include balls, pebbles, spheres, extrudates, channeled monoliths, honeycombed monoliths, microspheres, pellets or structural shapes, such as lobes, pills, cakes, honeycombs, powders, granules, and the like, formed using conventional methods, such as extrusion or spray drying. Where, for example, the final particles are designed for use as a fixed bed, the particles may preferably be formed into particles having a minimum dimension of at least about 0.01 inch and a maximum dimension of up to about one-half inch or one inch or more. Spherical particles having a diameter of about 0.03 inch to about 0.25 inch, preferably about 0.03 inch to about 0.15 inch, are often useful, especially in fixed bed or moving bed operations. With regard to fluidized bed systems, it is preferred that the major amount by weight of the particles have a diameter in the range of about 10 microns to about 250 microns, more preferably about 20 microns to about 150 microns.

As mentioned above, the catalyst of the present invention may also be deposited on or incorporated into a substrate, such as the matrix or binder mentioned above or a monolithic honeycomb structure. These monolithic structures may include ceramic monoliths, including those of cordierite, mullite, alpha ($\alpha$) alumina, or may include metal monoliths of aluminum-containing ferrite type stainless steel, or austenite type stainless steel, among others. When the catalyst of this invention is deposited on a monolithic substrate, it is typically done using a wash coat. The wash coat may be prepared, for example, by adding silica sol and water to the catalyst powder, milling the mixture to form a thixotropic slurry, dipping the monolithic substrate into the slurry, and then drying and calcining the resulting structure. The zeolite may also be formed and extruded directly into the desired monolithic shape.

As noted above, the catalytic reduction of nitrogen oxides is substantially effected by the use of the present process. By substantially effected is meant a conversion of greater than about 80, 85, 90, 95, or even 99% or more of the nitrogen oxides and the ammonia in the exhaust gas to innocuous compounds, such as nitrogen, through the use of this process. This is also referred to herein as conversion of a substantial portion of the $NO_x$ and ammonia in the exhaust gas to innocuous compounds.

The invention will now be illustrated by examples. The examples are for illustrative purposes only and are not to be construed as limiting the scope of the invention, which scope is defined by this entire specification including the appended claims.

EXAMPLE 1

Base ASM-5

A HZSM-5 catalyst, prepared according to U.S. Pat. No. 3,702,886, incorporated by reference herein, was used as the reference sample and was used as the basis for all of the other examples.

Example 2

Catalytic evaluation of base unimpregnated HZSM-5

In this example, the SCR activity of the base ZSM-5 catalyst from Example 1 is evaluated. The catalyst sample was evaluated using a fixed bed quartz reactor operating between 250°–550° C. The gas feed contained 500 ppm NO, 500 ppm $NH_3$, and 5% $O_2$ in a He carrier flowing at a constant gas hourly space velocity (GHSV) of 12,000 $hr^{-1}$. The gas effluent from the reactor was continuously monitored by non-dispersive infrared spectroscopy (NDIR) detectors. Catalyst activity results are reported below in Table 1.

TABLE 1

| Percent N in Feed Converted to $N_2$ | |
|---|---|
| Temperature, °C. | Base Catalyst |
| 550 | 89% |
| 455 | 100% |
| 400 | 100% |
| 345 | 71% |
| 250 | 26% |

Example 3

Preparation of an iron containing HZSM-5

An iron containing ZSM-5 catalyst was prepared by the following method: 7.6 g of the same HZSM-5 as that of Example 1 was heated in a stream of dry nitrogen to 375° C. After this temperature was maintained for 4 hours, the catalyst was cooled, in a stream of dry nitrogen, to room temperature. A solution of 0.5 g of ferrocene (dicyclopentadienyliron) in 30 g dry benzene was then added to the calcined zeolite and the slurry allowed to mix on a roller for about 16 hours. The benzene was allowed to evaporate at room temperature to give a benzene/ferrocene wetted zeolite. This wet solid was then heated to a temperature that did not exceed 100° C. in a vacuum oven so as to remove the residual benzene. This dry catalyst was then calcined in a stream of air at about 450° C. for about 6 hours to produce the desired iron containing catalyst, Catalyst A. The iron loading of this catalyst is about 1.8 wt. %.

Example 4

Catalytic evaluation of Catalyst A

In this example, the SCR activity of Catalyst A from Example 3 was evaluated. The catalyst sample was evaluated using a fixed bed quartz reactor operating between 250°–550° C. The gas feed contained 500 ppm NO, 500 ppm $NH_3$, and 5% $O_2$ in a He carrier flowing at a constant gas hourly space velocity (GHSV) of 12,000 $hr^{-1}$. The gas effluent from the reactor was continuously monitored by non-dispersive infrared spectroscopy (NDIR) detectors. Catalyst activity results are reported below in Table 2.

TABLE 2

| Percent N in Feed Converted to $N_2$ | |
|---|---|
| Temperature, °C. | Catalyst A |
| 550 | 90% |
| 455 | 97% |
| 400 | 98% |
| 345 | 98% |

TABLE 2-continued

| Percent N in Feed Converted to $N_2$ | |
|---|---|
| Temperature, °C. | Catalyst A |
| 250 | 95% |

Example 5

Preparation of an iron containing HZSM-5

An iron containing ZSM-5 catalyst was prepared by the following method: about 10 g of the same HZSM-5 as that of Example 1 was heated in a stream of dry air to 375° C. for 4 hours and then was cooled to room temperature. A solution of 0.1667 g of ferrocene (dicyclopentadienyliron) in 30 g dry toluene was then added to the dried zeolite and the slurry was mixed at room temperature overnight. Excess toluene was allowed to evaporate at room temperature to give a toluene/ferrocene wetted zeolite. The recovered solid was then calcined in a stream of dry air at about 538° C. for about 6 hours to produce the desired iron containing catalyst, Catalyst B. The iron loading of this catalyst is about 0.45 wt. %.

Example 6

Catalytic evaluation of Catalyst B

In this example, the SCR activity of Catalyst B from Example 5 was evaluated using similar equipment and the same procedure as Example 4. Catalyst activity results are reported below in Table 3.

TABLE 3

| Percent N in Feed Converted to $N_2$ | |
|---|---|
| Temperature, °C. | Catalyst B |
| 550 | 98% |
| 455 | 99% |
| 400 | 99% |
| 345 | 98% |
| 250 | 81% |

Example 7

Preparation of an iron containing HZSM-5

An iron containing ZSM-5 catalyst was prepared by the following method: about 10 g of the same HZSM-5 as that of Example 1 was heated in a stream of dry air to 375° C. for 4 hours and then was cooled to room temperature. A solution of 0.3331 g of ferrocene (dicyclopentadienyliron) in 30 g dry toluene was then added to the dried zeolite and the slurry was mixed at room temperature overnight. The slurry was filtered and washed once with 100 ml of Tetralin® to remove excess ferrocene from the external surface of the zeolite. Excess Tetralin® was allowed to evaporate at room temperature to give a Tetralin®/ferrocene wetted zeolite. The recovered solid was then calcined in a stream of dry air at about 538° C. for about 6 hours to produce the desired iron containing catalyst, Catalyst C. The iron loading of this catalyst is about 0.66 wt. %.

Example 8

Catalytic evaluation of Catalyst C

In this example, the SCR activity of Catalyst C from Example 7 was evaluated using similar equipment and the same procedure as Example 4. Catalyst activity results are reported below in Table 4.

TABLE 4

| Percent N in Feed Converted to $N_2$ | |
|---|---|
| Temperature, °C. | Catalyst C |
| 550 | 96% |
| 455 | 98% |
| 400 | 98% |
| 345 | 96% |
| 250 | 88% |

Example 9

Preparation of an iron containing HZSM-5

An iron containing ZSM-5 catalyst was prepared by the following method: about 10 g of the same HZSM-5 as that of Example 1 was heated in a stream of dry air to 375° C. for 4 hours and then was cooled to room temperature. A solution of 0.3331 g of ferrocene (dicyclopentadienyliron) in 30 g dry toluene was then added to the dried zeolite and the slurry was mixed at room temperature overnight. Excess toluene was allowed to evaporate at room temperature to give a toluene/ferrocene wetted zeolite. The recovered solid was then calcined in a stream of dry air at about 538° C. for about 6 hours to produce the desired iron containing catalyst, Catalyst D. The iron loading of this catalyst is about 1.05 wt. %.

Example 10

Catalytic evaluation of Catalyst D

In this example, the SCR activity of Catalyst D from Example 9 was evaluated using similar equipment and the same procedure as Example 4. Catalyst activity results are reported below in Table 5.

TABLE 5

| Percent N in Feed Converted to $N_2$ | |
|---|---|
| Temperature,°C. | Catalyst D |
| 550 | 95% |
| 455 | 98% |
| 400 | 98% |
| 345 | 97% |
| 250 | 91% |

Example 11

Aging of the HZSM-5 catalysts

The base HZSM-5 of Example 1 and Catalysts A through D as prepared above in Examples 3, 5, 7, and 9 were hydrothermally aged. Approximately 5 g of each catalyst was placed in individual identical crucibles and put in a controlled atmosphere furnace. The furnace was continuously purged with air containing 20 wt. % water vapor. The samples were treated in this moist atmosphere at 850° C. for 6 hours. The treated samples will be referred to as aged base HZSM-5, and aged Catalysts A through D.

Example 12

Catalytic evaluation of aged base HZSM-5

In this example, the SCR activity of the aged base HZSM-5 from Example 11 was evaluated using similar equipment and the same procedure as Example 4. Catalyst activity results are reported below in Table 6.

TABLE 6

| Percent N in Feed Converted to $N_2$ | |
| --- | --- |
| Temperature, °C. | Aged base HZSM-5 |
| 550 | 82% |
| 455 | 56% |
| 400 | 36% |
| 345 | 20% |
| 250 | 9% |

Example 13

Catalytic evaluation of aged Catalyst A

In this example, the SCR activity of the aged Catalyst A from Example 11 was evaluated using similar equipment and the same procedure as Example 4. Catalyst activity results are reported below in Table 7.

TABLE 7

| Percent N in Feed Converted to $N_2$ | |
| --- | --- |
| Temperature, °C. | Aged Catalyst A |
| 550 | 98% |
| 455 | 100% |
| 400 | 100% |
| 345 | 98% |
| 250 | 96% |

Example 14

Catalytic evaluation of aged Catalyst B

In this example, the SCR activity of the aged Catalyst B from Example 11 was evaluated using similar equipment and the same procedure as Example 4. Catalyst activity results are reported below in Table 8.

TABLE 8

| Percent N in Feed Converted to $N_2$ | |
| --- | --- |
| Temperature, °C. | Aged Catalyst B |
| 550 | 98% |
| 455 | 100% |
| 400 | 99% |
| 345 | 88% |
| 250 | 37% |

Example 15

Catalytic evaluation of aged Catalyst C

In this example, the SCR activity of the aged Catalyst C from Example 11 was evaluated using similar equipment and the same procedure as Example 4. Catalyst activity results are reported below in Table 9.

TABLE 9

| Percent N in Feed Converted to $N_2$ | |
| --- | --- |
| Temperature, °C. | Aged Catalyst C |
| 550 | 98% |
| 455 | 99% |
| 400 | 92% |
| 345 | 57% |
| 250 | 27% |

Example 16

Catalytic evaluation of aged Catalyst D

In this example, the SCR activity of the aged Catalyst D from Example 11 was evaluated using similar equipment and the same procedure as Example 4. Catalyst activity results are reported below in Table 10.

TABLE 10

| Percent N in Feed Converted to $N_2$ | |
| --- | --- |
| Temperature, °C. | Aged Catalyst D |
| 550 | 97% |
| 455 | 100% |
| 400 | 99% |
| 345 | 90% |
| 250 | 33% |

We claim:

1. A method for selective catalytic reduction, prior to discharge, of an exhaust gas contaminated with $NO_x$ comprising:
   a) impregnating an intermediate pore size zeolite powder with ferrocene in a solvent under conditions effective to deposit an iron concentration on the zeolite sufficient to allow a conversion of at least 27 weight percent of the total nitrogen compounds present in the exhaust gas at a temperature of 250° C. after the impregnated zeolite produced thereby has been steamed at 850° C. using 20 weight percent steam for 6 hours;
   b) incorporating the zeolite with a matrix;
   c) calcining the impregnated zeolite and the matrix to thereby produce a calcined catalyst;
   d) adding ammonia to an exhaust gas comprising nitrogen oxides, thereby forming a mixture of the exhaust gas and the ammonia;
   e) contacting the gas mixture with said calcined catalyst at conditions effective to substantially convert the $NO_x$ and the ammonia to innocuous compounds, the conditions comprising a temperature less than 455° C.

2. The method according to claim 1 comprising selecting the solvent from those organic liquids suitable for dissolving ferrocene.

3. The method according to claim 2 comprising selecting the solvent from those organic liquids capable of being removed from the impregnated zeolite under conditions that avoid sublimation of the ferrocene from the zeolite.

4. The method according to claim 1 comprising drying the zeolite prior to impregnation.

5. The method according to claim 1 comprising impregnating the zeolite by contacting the zeolite with the ferrocene in the solvent for a period of more than about 4 hours.

6. The method according to claim 1 comprising combining the zeolite with the matrix before impregnation.

7. The method according to claim 6 comprising contacting the impregnated zeolite and the matrix with an organic solvent before calcining the zeolite and matrix.

8. The method according to claim 7 comprising contacting the impregnated zeolite and the matrix with an organic solvent before calcining the zeolite and matrix, said organic solvent having an effective atomic diameter greater than the zeolite pore size.

9. The method according to claim 1 comprising combining the zeolite with the matrix after impregnation.

10. The method according to claim 1 comprising calcining the impregnated zeolite and the matrix at a temperature up to about 950° C.

11. The method according to claim 1 comprising contacting the gas mixture and the calcined at a temperature of less than about 400° C., at a pressure of about 5 to about 500 psia, and at a gas hourly space velocity (GHSV) of about 1,000 to about 100,000 hr$^{-1}$.

12. The method according to claim 1 comprising hydrothermally treating the calcined zeolite under conditions effective to further enhance the hydrothermal stability prior to contacting the gas mixture with the zeolite.

13. The method according to claim 12 comprising hydrothermally treating the calcined zeolite at a temperature of greater than about 400° C., with about 5 to about 100 percent steam, for a period of from a few minutes to about 100 hours prior to contacting the gas mixture with the zeolite.

14. The method according to claim 1 comprising impregnating the zeolite at conditions effective to deposit about 0.01 to about 5 wt. % iron on the zeolite.

15. The method according to claim 1 comprising selecting the zeolite from the intermediate pore zeolites ZSM-5, ZSM-11, ZSM-12, ZSM-21, ZSM-22, ZSM-23, ZSM-35, ZSM-38, ZSM-48, ZSM-57, and ZSM-58.

16. The method according to claim 1 comprising impregnating a zeolite having the MFI framework topology.

17. The method according to claim 1 comprising adding the approximate stoichiometric amount of ammonia.

18. A process for selective catalytic reduction of oxides of nitrogen in a mixture of gases comprising ammonia, which process comprises:
   a) impregnating zeolite ZSM-5 with ferrocene dissolved in an organic solvent by contacting the zeolite with the ferrocene solution for a period of time greater than about 8 hours to thereby produce an impregnated zeolite, said impregnation effective to put more than about 1.5 weight percent iron onto the zeolite;
   b) recovering the impregnated zeolite by drying the zeolite at a temperature less than about 100° C.;
   c) calcining the recovered zeolite in air at a temperature greater than about 400° C. for at least about 4 hours;
   d) contacting the gas mixture with the calcined zeolite in a reaction zone at a temperature of less than about 350° C., at a pressure of about 10 to about 30 psia, and at a gas hourly space velocity of from about 2,500 to about 50,000 hr$^{-1}$; and
   e) discharging the gas mixture from the reaction zone.

\* \* \* \* \*